United States Patent [19]
Koch

[11] 3,744,727
[45] July 10, 1973

[54] DEVICE FOR REGENERATING FOIL WEBS OR FOIL STRIPS INTO A GRANULATE

[76] Inventor: Heinrich Koch, Jakobstr. 88, 52 Siegburg, Germany

[22] Filed: Mar. 4, 1971

[21] Appl. No.: 120,868

[30] Foreign Application Priority Data
Mar. 16, 1970 Germany.................P 20 12 344.8

[52] U.S. Cl.................. 241/93, 241/101.5, 241/224
[51] Int. Cl............................................ B02c 19/00
[58] Field of Search .................. 241/34, 36, 63, 83, 241/91, 93, 101 R, 221, 222, 224, 225, 227; 425/71, 202, 308, 315, 377

[56] References Cited
UNITED STATES PATENTS

| 351,080 | 10/1886 | Upton................................ 241/93 X |
| 1,598,842 | 9/1926 | Arrowood......................... 241/101 R |
| 2,639,096 | 5/1953 | Hinerfeld........................... 241/222 |
| 3,617,005 | 11/1971 | Pearson............................. 241/36 X |
| 2,382,655 | 8/1945 | Nichols............................. 425/202 X |
| 3,193,601 | 7/1965 | Billingsley........................ 18/125 H |
| 3,277,519 | 10/1966 | Jones................................ 425/315 X |
| 3,545,686 | 12/1970 | Brown................................ 241/243 |
| 3,551,943 | 1/1971 | Staton et al..................... 425/308 X |

*Primary Examiner*—Granville Y. Custer, Jr.
*Attorney*—Walter Becker

[57] ABSTRACT

An apparatus for regenerating foil webs and foil strips to granulates, which comprises an extruder having its inlet fixedly connected to a funnel-shaped supply container and also having an outlet into which extends a worm with agitator, said worm tapering toward the interior of said extruder. Above said supply container there is arranged a grate roller and counter roller cooperating therewith for receiving material to be regenerated and diminuting said material and conveying it to said extruder, which in its turn passes the material received from said grate roller through a bath and drying device to a granulator and granulate packing device associated therewith.

3 Claims, 4 Drawing Figures

INVENTOR
Heinrich Koch

INVENTOR
Heinrich Koch

DEVICE FOR REGENERATING FOIL WEBS OR FOIL STRIPS INTO A GRANULATE

The present invention relates to a device for regenerating webs or strips of foil to form a granulate. When producing and processing foil webs of synthetic material, rejects as well as waste are obtained. Such rejects and waste material can, however, be regenerated to the starting material, i.e. a granulate, becuase the synthetic material employed for the foils will during its regenerating process not lose its basic properties.

Various regenerating devices have become known by means of which it is possible to regenerate rejects as well as waste. According to one heretofore known device, a beater mill is used for regenerating the foil material. In such beater mill the foil web or foil waste is crushed and subsequently is mixed in a dry mixer until due to the occurring frictional heat a granular agglomerate is formed which can again be used as starting material. The drawback of this heretofore known device consists in that the crushing of the foil webs or foil waste in the beater mill as well as the subsequent treatment in the dry mixer have to be controlled with highest accuracy because, for instance, polyvinylchloride foils are extremely sensitive to an excessive heat development. Already when a slight excess temperature occurs, chemical reactions take place with these foils which change the character of the basic material. Therefore, with this known device, especially the mixing process had to be controlled precisely by the respective operator.

For purposes of regenerating foils or foil waste it has also become known to melt the foil waste material or the foils and subsequently to further process the same to the basic material. The melting of the foil webs and foil waste can, however, be carried out only with such synthetic materials which do not lose their basic properties during the melting operation.

The drawback of the heretofore known devices for regenerating foil webs or foil waste material of synthetic material consists primarily in that it is not possible to carry out the work in a continuous operation nor is it possible to carry out the operations without the presence of skilled operators. Furthermore, the employed regenerating methods are not feasible for all foils of synthetic material.

It is, therefore, an object of the present invention to provide a device which will work automatically and in a continuous manner and which will be independent of the kind of foil material employed.

This object and other objects and advantages of the invention will appear more clearly from the following specification in connection with the accompanying drawings, in which:

FIG. 1 diagrammatically illustrates a regenerating device according to the present invention.

Figure 1:
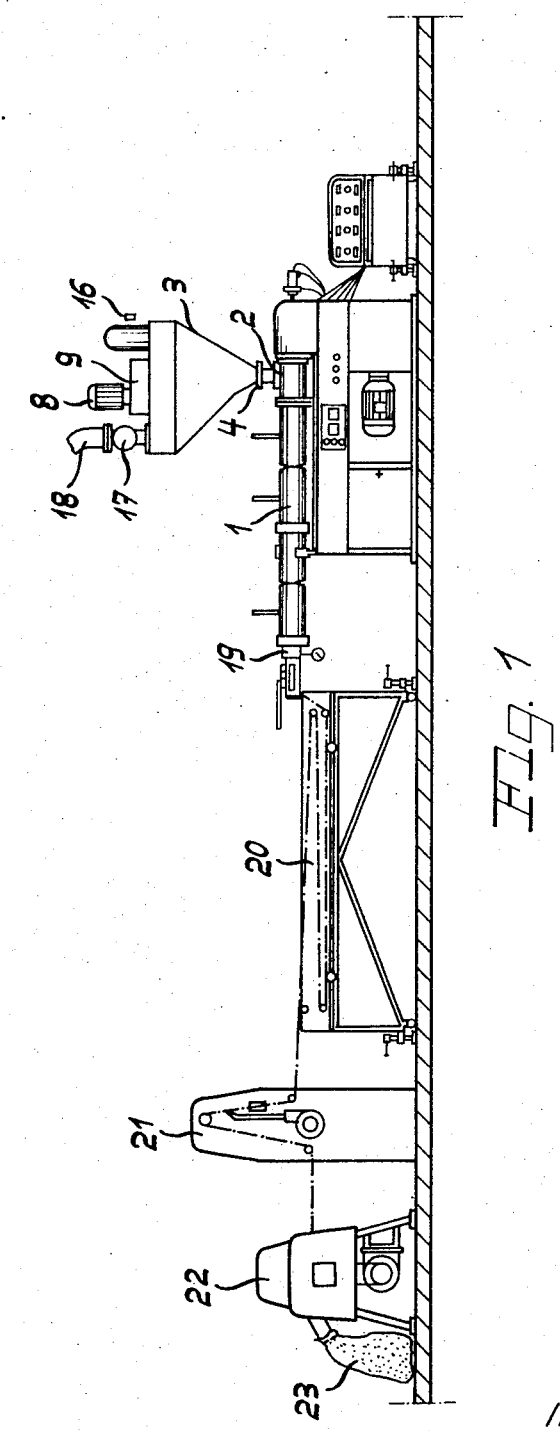
Figure 2:
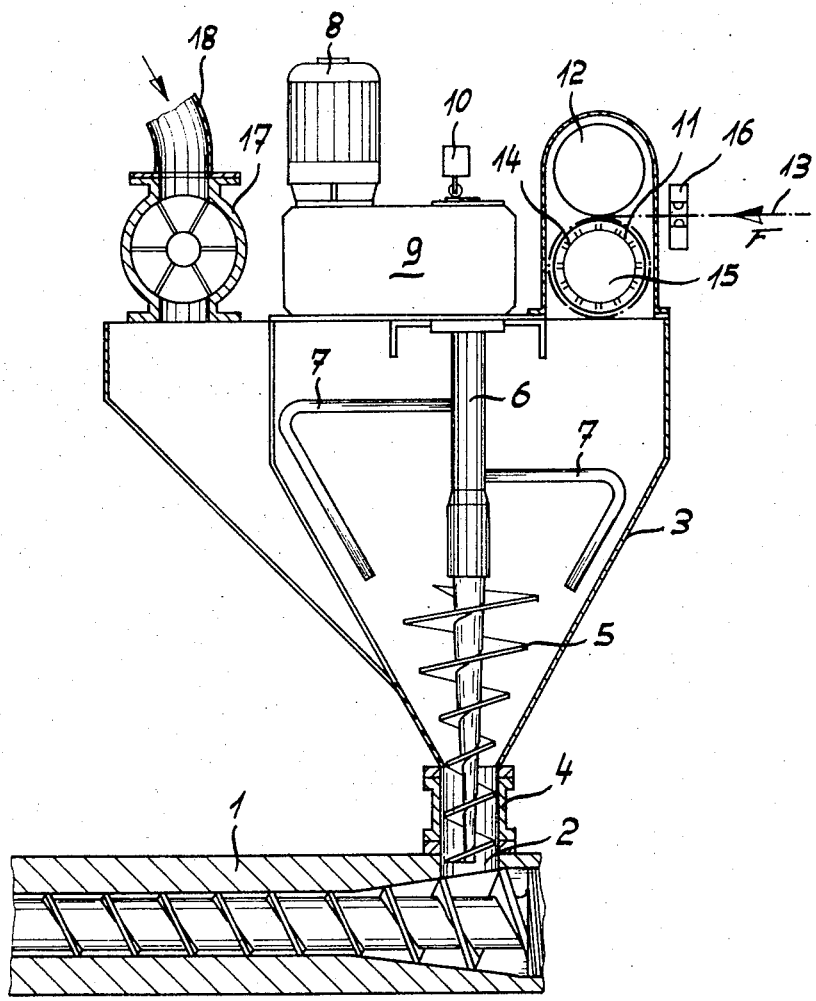
FIG. 2 illustrates on a somewhat larger scale than FIG. 1 a portion of the extruder of the device of FIG. 1 together with the auxiliary devices associated therewith.

The device according to the present invention is characterized primarily by an extruder the inlet of which has fixedly connected thereto a funnel-shaped supply container into which extends a worm with an agitator which worm extends into the extruder inlet and tapers toward the latter. The device according to the invention furthermore comprises a grate roller which is arranged above the supply container or is fixedly connected thereto while there is also provided a counter pressure roller. Finally, the device comprises a water bath adjacent the extruder, a drying device, and a granulator with an adjacent granulate packing device.

As charging device for the supply container there may, in addition to the grate roller with counter pressure rollers, also be provided a rotary trap connected through a conduit with a silo.

The grate roller with counter pressure rollers as well as the rotary trap may be controlled in conformity with each other or independently of each other in order to make sure that during the regenerating treatment of the foil webs or foil strips by means of the grate roller with pressure rollers the process can continue when the band or strip breaks. The invention furthermore provides a band or strip checking device, preferably in the form of a photoelectric cell which precedes the grate roller with counter rollers and by means of which in response to a break of the band or strip material, the rotary trap will be made effective, and granulate will be fed from a silo. In this way it will be assured that the regenerating extruder can work without interruption. At the instant at which the supply container is again filled with foil material which has been pretreated by the grate roller with counter pressure rollers, the rotary trap is turned off. There also exists the possibility of withdrawing the foil webs or foil strips not from a bale but directly from the calender. In order to assure that the entire operation can be carried out in a continuous manner, it is suggested, according to a further development of the invention, that the withdrawing speed of the grate roller with counter pressure rollers is adapted to be controlled driectly by the calender by means of any standard auxiliary devices.

Rferring now to the drawings in detail, a regenerating plant or device for the preparatory treatment of webs of foil of synthetic material according to the present invention comprises a regenerating extruder 1 having an inlet 2 to which is firmly connected a funnel-shaped supply or storage container 3. The connection between the extruder 1 and the supply container 2 is effected by a flange-like intermediate member 4. In the container 3 there is provided a worm 5 which tapers toward the extruder inlet 2. The worm 5 has an upwardly extending shaft 6 on which is mounted an agitator mechanism 7 for rotation with the worm 5. Worm 5 together with agitator mechanism 7 is driven by a motor 8 through the interposed transmission 9. To safeguard the motor 8 in case the worm 5 is overloaded, there is provided a limit switch 10 which in such instance will turn off the motor 8. The foil material to be regenerated in the extruder 1 is first pretreated in a grate roller 11 with pressure roller 12. The pretreatment of the foils 13 entering in the direction of the arrow F is effected in such a way that by means of the grate roller 11 the foil web or foil strip is cut into individual sections while in view of the continuous winding-up of the web or strip material in cooperation with the heated grate bars, the cut off or separated sections are pressed against each other layer for layer and are fused to each other at the cutting edges. The thus fused together sections are through the free grate cross-sections 14 pressed in the form of a strand into the inner chamber 15 of the grate roller and from there are conveyed into the supply container 3 by standard tearing and conveying means. For purposes of checking the feeding of the material to be processed to the grate roller, a photoelectric cell 16 is provided serving as band checking means. The photoelectric cell 16 is coupled to the rotary trap 17 in such a way that when the band or strip breaks or tears off whereby automatically the supply of pretreated foil material to the container 3 is interrupted, the device 17 is automatically turned on and conveys through a pipe line 18 connected to a non-illustrated silo, for instance, polyethylene granulate or a polyvinylchloride mixture into the container 3. In this way it will be assured that the worm of the extruder 1 can always sufficiently be supplied with synthetic material so that a burning of the material will be prevented. As soon as the web or strip of foil material is again threaded into the grate roller 11, the device 17 will turn off.

If a disorder occurs in the opeation of the plant or calender or if a change in the calender is to be effected, the extruder has to be stopped for a shorter or longer period of time. During a short interruption, the device 17 feeds corresponding PVC-material to the extruder. If a longer standstill period of the extruder is necessary, there exists the danger that the PVC-material in the extruder will in view of the longer stay be destroyed as far as its chemical structure is concerned and can no longer be used. In such an instance, instead of the PVC-material, high pressure polyethylene is supplied by the device 17 which material is non-sensitive against a longer stay in the worm. After the calender has again been started and strip material is again pressed into the extruder while the worm is continuously operating, the oncoming PVC-material will press the polyethylene in the worm out of the latter. After a short period of operation, it is again possible to process polyvinylchloride foils in a continuous operation.

The material regenerated in the extruder 1 is discharged through a nozzle head 19 in the form of a band and is then passed through a water bath 20. Subsequently, the thus regenerated material is conveyed over a drying path 21 and from there is passed into a granulator 22 which is coupled to a packing or a wrapping device which automatically closes the sack or bag 23 filled with granulate.

If the strip material directly coming from the calender is processed in the plant according to the present invention, the strand discharged through the nozzle head 19 of the extruder 1 can be directly conveyed to the calender for the purpose of making new foils.

Figure 3:
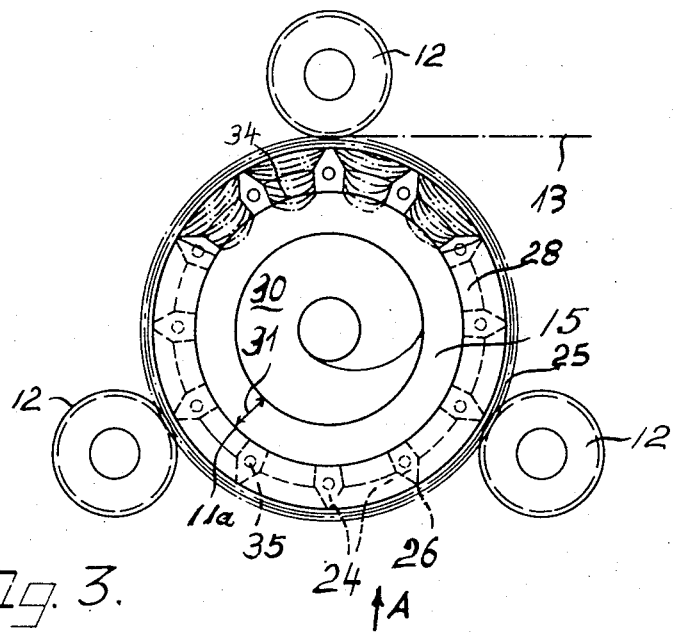
FIG. 3 represents a section through a grate roller for use in connection with the device of FIG. 1, said section being taken along the line III — III of FIG. 4.
Figure 4:
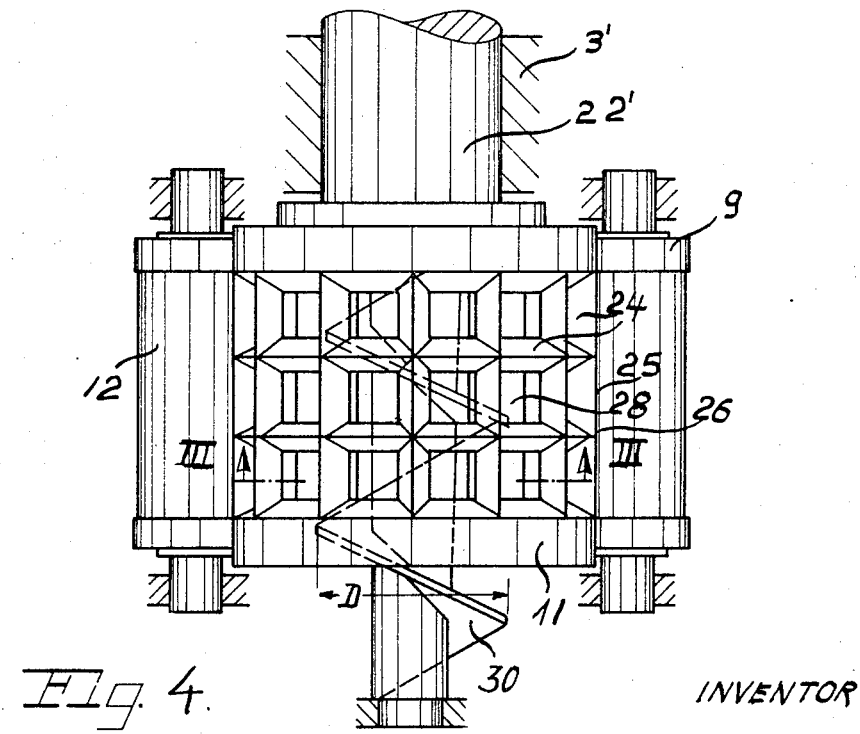
FIG. 4 is a view of FIG. 3 as seen in the direction of the arrow A in FIG. 3.

As shown more specifically in FIG. 4, the grate roller 11 is journalled at 3' by means of a shaft 22'. Grate roller 11 comprises bars 24 which at their surface 25 have a sharp edge 26 and which have a cross-section that increases toward the inner chamber 15 of the grate roller. The enlargement of the cross-section of the grate bars 24, as is particularly clearly shown in FIG. 3, extends in this embodiment over a certain length only and then remains constant. Regardless of whether the increase in cross-section of the bars of grate roller 11 toward the interior 15 of the grate roller is continuous over the entire thickness of the roller or only over a portion thereof and then is constant, free passage 28 are formed which in view of the configuration of the cross-section of the bars 24 of the grate roller are funnel-shaped or taper. As will be evident from FIG. 4, the bars or webs are so arranged with regard to each other that free passages of square cross-section are formed. The arrangement of the bars 24 may, however, also be such that passages of a different cross-section, for instance, rectangular, oval or circular cross-section, are formed. The rectangular or square cross-section, however, is preferred. The pressure rollers 12 cooperate with the grate roller 11 and are offset with regard to each other by 120° as is best seen in FIG. 3. There exists, of course, also the possibility to employ only one or more than three pressure rollers 12. A conveyor, preferably a worm 30, cooperates with the grate roller 11. Worm 30 extends into the interior 15 of the grate roller and has its largest diameter D so dimensioned that a free space 31 is formed between the worm 30 and the inner configuration 11a of the grate roller.

The operation is as follows: The web of foil 13, for instance, a web of polyvinylchloride, is wound onto the grate roller 11, and in view of the continuously increasing layer thickness is pressed against the edges 26 of the bars 24 of the grate roller whereby the foil web is cut into individual sections. This cutting or division is facilitated by a heating effect produced by the bars 24. Simultaneously with the separation into individual foil sections at the edges 26 of the webs or bars 24, a fusing of the individual superimposed layers takes place which is aided by the corresponding configuration of the bars 24 and the formation of tapered free passages 28. During the continuous winding-up of the foil web 13 onto the grate roller 11 and the thus inherent separation of the web 13 into separate sections, individual strands 34 (FIG. 3) are formed which move through the free passages 28 of the grate roller 11 into the interior chamber 15 of the grate roller. Here the individual strands are grasped by the worm 30 and are divided into individual package-like structures and are subsequently conveyed to a supply or further processing station.

The heating up of the grate rollers may be effected in any suitable manner. For instance, the bars 24 may be provided with bores 35 through which heated-up oil is passed or into which heated-up rods or wires extend. The temperature of the grate bars 24 is such that the working of the foil is effected at temperatures of from 90°C to 100°C.

In this way foil bands of any width may be processed. Prior to the bands hitting the grate rollers 11, the bands 13 must be laterally gathered if they are wider than the width of the grate roller. These steps, however, can be easily effected.

It is also advantageous that the entire winding-up and separating process can be so coupled with the discharge step that no more material is discharged than is wound up and divided into sections.

The device according to the present invention for refining foil webs or foil strips to make a granulate has the advantage that the entire regenerating process can be carried out in a continuous manner and is entirely or partially automatic. The device according to the present invention can therefore be supervised by a single operator. Moreover, the plant or device according to the present invention is simple and can easily be checked so that no skilled personnel is necessary. Moreover, the device according to the invention can be employed not only by producers of foils but also by users of foils or in plants which further process foils. When the device is used in a foil manufacturing plant, the device according to the present invention may be connected directly to a calender while the band speeds can be tuned to each other. When the device is used in plants which further process the foils, the foil webs or strips may be rolled to form bales and from there may be conveyed to the regenerating device.

It is, of course, to be understood that the present invention is, by no means, limited to the particular construction shown in the drawings but also comprises any modifications within the scope of the appended claims.

What I claim is:

1. An apparatus for washable preparation regenerating foil webs and foil strips to granulates, which includes in combination: extruder means having inlet means and outlet means, funnel-shaped supply container means connected to said inlet means, worm means rotatably arranged in said container means and having its windings decrease in diameter in the direction toward the inlet means of said extruder means, said worm means extending into said inlet means, shaft means coaxial with and rotatably connected to said worm means and provided with agitator arms for cooperation with said worm means, motor means drivingly connected to said shaft means for rotating the same and thereby said worm means, grate roller means arranged adjacent said container means for receiving web and strip material and diminuting the same and conveying it into said container means, said grate roller means having a peripheral surface formed as a grid with openings therethrough bordered by cutting edges, and having central means to convey material to said supply container means, and pressure roller means on the periphery of said grate roller means operating to press strip material wound on said grate roller means against said cutting edges and through said openings to said central means.

2. An apparatus in combination according to claim 1, which includes rotary trap means having inlet means and having outlet means located above and for connection with said container means for feeding synthetic material to said container means in case of a standstill of said grate roller means while said worm means is operating.

3. An apparatus in combination according to claim 2, which includes electric control means adjacent the feeding path of material to be regenerated leading to said grate roller means for detecting an accidental break in the continuous supply of the material to be regenerated to said grate roller means, and means operatively connecting said control means with said rotary trap means to respectively activate and de-activate the latter in response to an accidental break in and re-establishment of the continuous supply of the material to be regenerated to said grate roller means.

* * * * *